United States Patent
Duan et al.

(10) Patent No.: US 12,073,550 B2
(45) Date of Patent: Aug. 27, 2024

(54) OVERHANG DETECTION METHOD, APPARATUS AND DEVICE FOR BATTERY ELECTRODE SHEET, AND STORAGE MEDIUM

(71) Applicant: CONTEMPORARY AMPEREX TECHNOLOGY CO., LIMITED, Ningde (CN)

(72) Inventors: Pengfei Duan, Ningde (CN); Qi Chen, Ningde (CN); Jianlei Wang, Ningde (CN); Ya Dai, Ningde (CN); Yang Lei, Ningde (CN)

(73) Assignee: ONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/595,413

(22) Filed: Mar. 4, 2024

(65) Prior Publication Data
US 2024/0202904 A1    Jun. 20, 2024

Related U.S. Application Data

(63) Continuation of application No. PCT/CN2022/089070, filed on Apr. 25, 2022.

(51) Int. Cl.
*G06T 7/12* (2017.01)
*G06T 7/00* (2017.01)

(52) U.S. Cl.
CPC .............. *G06T 7/0004* (2013.01); *G06T 7/12* (2017.01); *G06T 2207/30108* (2013.01)

(58) Field of Classification Search
CPC  G06T 7/0004; G06T 7/12; G06T 2207/30108
(Continued)

(56) References Cited

U.S. PATENT DOCUMENTS

| 11,580,664 | B2 * | 2/2023 | Liu | G06N 3/08 |
| 2015/0090503 | A1 * | 4/2015 | McQueen | G01G 23/00 177/1 |

(Continued)

FOREIGN PATENT DOCUMENTS

| CN | 112465814 A | 3/2021 |
| CN | 112577421 A | 3/2021 |

(Continued)

OTHER PUBLICATIONS

The World Intellectual Property Organization (WIPO) International Search Report and Written Opinion for PCT/CN2022/089070 Dec. 27, 2022 12 Pages (including translation).
(Continued)

*Primary Examiner* — Sheela C Chawan
(74) *Attorney, Agent, or Firm* — ANOVA LAW GROUP, PLLC (57) ABSTRACT

An Overhang detection method for a battery electrode sheet includes acquiring an image of a battery electrode sheet; determining the locations of a plurality of electrode sheet edges in the image, wherein the plurality of electrode sheet edges are electrode sheet edges related to an Overhang measurement value corresponding to the image, the location of each electrode sheet edge is determined on the basis of an area where each electrode sheet edge is located, and the area where each electrode sheet edge is located is a dynamically determined area; and determining, according to the locations of the plurality of electrode sheet edges, the Overhang measurement value corresponding to the image.

19 Claims, 4 Drawing Sheets

(58) Field of Classification Search
USPC .................................................. 382/100, 141
See application file for complete search history.

(56) References Cited

U.S. PATENT DOCUMENTS

| | | | |
|---|---|---|---|
| 2021/0209739 A1* | 7/2021 | Wen | H01M 10/4285 |
| 2022/0198698 A1* | 6/2022 | Liu | G06N 3/08 |
| 2022/0376305 A1 | 11/2022 | Lee et al. | |
| 2023/0109910 A1* | 4/2023 | Bruder | G01R 31/392 |
| | | | 702/63 |
| 2023/0393216 A1* | 12/2023 | Park | G01R 31/389 |

FOREIGN PATENT DOCUMENTS

| | | |
|---|---|---|
| CN | 113624137 A | 11/2021 |
| DE | 19836192 C1 | 12/1999 |
| EP | 0293858 A2 | 12/1988 |
| JP | 2010287386 A | 12/2010 |
| KR | 20220020506 A | 2/2022 |
| WO | 2023206020 A1 | 11/2023 |

OTHER PUBLICATIONS

Korean Intellectual Property Office (KIPO) Written Decision on Registration for Application No. 10-2024-7008467 Apr. 22, 2024 10 Pages (including translation).

* cited by examiner

OVERHANG DETECTION METHOD, APPARATUS AND DEVICE FOR BATTERY ELECTRODE SHEET, AND STORAGE MEDIUM

CROSS-REFERENCE TO RELATED APPLICATION

This application is a continuation of International Application No. PCT/CN2022/089070, filed on Apr. 25, 2022, the entire content of which is incorporated herein by reference.

TECHNICAL FIELD

The present application relates to the technical field of battery detection, and in particular to an Overhang detection method, apparatus and device for a battery electrode sheet, and a storage medium.

BACKGROUND ART

A laminating machine is used for a lamination forming process of a battery, and may compound a cathode, an anode and a separator (diaphragm) of the battery. For a compounded electrode sheet, it is needed to measure the size of Overhang (which refers to a part exceeding positive and negative electrode sheets in the length and width directions of a negative electrode sheet), so as to judge whether the compounded electrode sheet meets requirements.

The existing Overhang measurement technology employs a traditional fixed-area linear fitting solution to position each electrode sheet edge in a fixed area, and then determine an Overhang measurement value on the basis of the positioning result of each electrode sheet edge. In this way, the positioning mode depends on the fixed area, so that the flexibility is worse; and since the flexibility is worse, the adaptability is also worse during actual application.

SUMMARY

The objective of the present application is to provide an Overhang detection method, apparatus and device for a battery electrode sheet, and a storage medium, so as to improve the flexibility and adaptability of Overhang measurement.

In a first aspect, the present application provides an Overhang detection method for a battery electrode sheet, including: acquiring an image of a battery electrode sheet; determining the locations of a plurality of electrode sheet edges in the image, wherein the plurality of electrode sheet edges are electrode sheet edges related to an Overhang measurement value corresponding to the image, the location of each electrode sheet edge is determined on the basis of an area where each electrode sheet edge is located, and the area where each electrode sheet edge is located is a dynamically determined area; and determining, according to the locations of the plurality of electrode sheet edges, the Overhang measurement value corresponding to the image.

In the present application, when the location of each electrode sheet edge related to the Overhang measurement value corresponding to the image is determined, the location of each electrode sheet edge is determined on the basis of the area where each electrode sheet edge is located; and the area where each electrode sheet edge is located is a dynamically determined area. Compared with the related art, the traditional fixed-area linear fitting solution is not utilized any more, but the location of each electrode sheet edge is determined on the basis of the dynamically determined area, and since the area is not fixed any more, the positioning of each electrode sheet edge is more flexible. For example, there is no need to divide, in advance, the area where each electrode sheet edge is located. Therefore, by means of this mode, the flexibility of positioning each electrode sheet edge can be improved, thereby improving the flexibility of Overhang measurement; and on the basis of improving the flexibility, the adaptability of Overhang measurement is correspondingly improved. For example, when the positioning of the fixed area is not considered, this mode can be applicable to the Overhang measurement of more complex environments.

As a possible implementation, the area where each electrode sheet edge is located is an area determined on the basis of preset area parameter information, or an area determined on the basis of the location of one or more electrode sheet edges.

In the present application, the area where each electrode sheet edge is located may be determined on the basis of the preset area parameter information, and may also be determined on the basis of the location of one or more electrode sheet edges, so that the positioning mode of each electrode sheet edge is more flexible.

As a possible implementation, the image includes: a first electrode sheet edge and a second electrode sheet edge; an area where the first electrode sheet edge is located is determined on the basis of the preset area parameter information, and an area where the second electrode sheet edge is located is determined on the basis of the location of the first electrode sheet edge and a first location relationship; and the first location relationship is a location relationship between the first electrode sheet edge and the second electrode sheet edge.

In the present application, for the first electrode sheet edge and the second electrode sheet edge, the area where the first electrode sheet edge is located may be determined on the basis of a preset area parameter, and the area where the second electrode sheet edge is located is determined on the basis of the location of the first electrode sheet edge and the first location relationship, that is, the area where the electrode sheet edge is located may be flexibly determined in combination with the location of one electrode sheet edge, so that the flexibility of positioning the electrode sheet edge is improved.

As a possible implementation, the image further includes: a third electrode sheet edge; an area where the third electrode sheet edge is located is determined on the basis of the location of the first electrode sheet edge, the location of the second electrode sheet edge and a second location relationship; and the second location relationship is a location relationship among the first electrode sheet edge, the second electrode sheet edge and the third electrode sheet edge.

In the present application, the area where the third electrode sheet edge is located is determined in combination with the location of the first electrode sheet edge, the location of the second electrode sheet edge and the second location relationship, that is, the area where the electrode sheet edge is located may be flexibly determined in combination with the locations of at least two electrode sheet edges, so that the flexibility of positioning the electrode sheet edge is improved.

As a possible implementation, the image further includes: a fourth electrode sheet edge; an area where the fourth electrode sheet edge is located is determined on the basis of the location of the first electrode sheet edge, the location of the second electrode sheet edge, the location of the third electrode sheet edge and a third location relationship; and the third location relationship is a location relationship among the first electrode sheet edge, the second electrode sheet edge, the third electrode sheet edge and the fourth electrode sheet edge.

In the present application, the area where the fourth electrode sheet edge is located is determined in combination with the location of the first electrode sheet edge, the location of the second electrode sheet edge, the location of the third electrode sheet edge and the third location relationship, that is, the area where the electrode sheet edge is located may be flexibly determined in combination with the locations of at least three electrode sheet edges, so that the flexibility of positioning the electrode sheet edge is improved.

As a possible implementation, the first electrode sheet edge is a vertical cathode edge, the second electrode sheet edge includes a vertical anode edge and a horizontal cathode edge, the third electrode sheet edge includes a horizontal cathode ceramic edge and a horizontal separator edge, and the fourth electrode sheet edge is a horizontal anode edge.

In the present application, the electrode sheet edges related to the Overhang measurement value include: the vertical cathode edge, the vertical anode edge, the horizontal cathode edge, the horizontal cathode ceramic edge, the horizontal separator edge and the horizontal anode edge, and flexible positioning of these electrode sheet edges is realized in a positioning mode based on dynamic areas, so that the Overhang measurement value is flexibly determined.

As a possible implementation, the step: determining, according to the locations of the plurality of electrode sheet edges, the Overhang measurement value corresponding to the image, includes: determining a distance between a cathode ceramic electrode sheet and a separator according to the location of the horizontal cathode ceramic edge and the location of the horizontal separator edge; determining a distance between an anode and the separator according to the location of the horizontal anode edge and the location of the horizontal separator edge; determining a first distance between a cathode and the anode according to the location of the horizontal cathode edge and the location of the horizontal anode edge; determining a second distance between the cathode and the anode according to the location of the vertical cathode edge and the location of the vertical anode edge; determining a distance between the anode and the cathode ceramic electrode sheet according to the location of the horizontal anode edge and the location of the horizontal cathode ceramic edge; determining a cathode sheet width according to the location of the vertical cathode edge; determining an anode sheet width according to the location of the vertical anode edge; and according to the distance between the cathode ceramic electrode sheet and the separator, the distance between the anode and the separator, the first distance, the second distance, the distance between the anode and the cathode ceramic electrode sheet, the cathode sheet width and the anode sheet width, determining the Overhang measurement value corresponding to the image.

In the present application, by means of determining the distance between the cathode ceramic electrode sheet and the separator, the distance between the anode and the separator, the first distance, the second distance, the distance between the anode and the cathode ceramic electrode sheet, the cathode sheet width and the anode sheet width, the Overhang measurement value corresponding to the image is accurately determined.

As a possible implementation, the image includes a plurality of images of the battery electrode sheet, and the plurality of images respectively correspond to different areas of the battery electrode sheet; and the detection method further includes: according to Overhang measurement values respectively corresponding to the plurality of images, and a location relationship between the different areas, determining an Overhang measurement value corresponding to the battery electrode sheet.

In the present application, images of different areas of the battery electrode sheet are collected, and then the corresponding Overhang measurement values are determined respectively. Compared with an overall image determination mode, on one hand, the image processing mode is more flexible; and on the other hand, the fine-grained image processing precision is higher, and the final measurement result is more accurate as well.

As a possible implementation, the plurality of images respectively correspond to four-corner areas of the battery electrode sheet.

In the present application, the four-corner areas of the battery electrode sheet have symmetry, therefore not only can the universality or consistency of the processing modes of the images be guaranteed, but the Overhang measurement value corresponding to the battery electrode sheet can also be conveniently determined on the basis of the Overhang measurement values of the plurality of images.

As a possible implementation, for any electrode sheet edge, the process of determining the location of the electrode sheet edge includes: according to the location of the area where the electrode sheet edge is located, determining the location of an edge transition point in the area where the electrode sheet edge is located; and determining the location of the electrode sheet edge on the basis of the location of the edge transition point and a linear fitting algorithm.

In the present application, on the basis of the dynamically determined area of each electrode sheet edge, the location of the edge transition point in the area where the electrode sheet edge is located is firstly determined, and then the location of the electrode sheet edge is effectively and accurately positioned on the basis of the location of the edge transition point and the linear fitting algorithm.

In a second aspect, the present application provides an Overhang detection apparatus for a battery electrode sheet, including: various functional modules for implementing the Overhang detection method for the battery electrode sheet in the first aspect and any one of the possible implementations in the first aspect.

In a third aspect, the present application provides an Overhang detection device for a battery electrode sheet, including: a processor; and a memory in communication connection with the processor, wherein the memory stores instructions executable by the processor, and the instructions are executed by the processor, so that the processor may execute the Overhang detection method for the battery electrode sheet in the first aspect and any one of the possible implementations in the first aspect.

In a fourth aspect, the present application provides a computer-readable storage medium, wherein a computer program is stored on the computer-readable storage medium, and when run by a computer, the computer program executes the Overhang detection method for the battery electrode sheet in the first aspect and any one of the possible implementations in the first aspect.

BRIEF DESCRIPTION OF DRAWINGS

To illustrate technical solutions in the embodiments of the present application more clearly, a brief introduction on the drawings which are needed in the embodiments of the present application is given below. It should be understood that the following drawings only illustrate some embodiments of the present application, and thus should not be considered as limiting the scope. Other related drawings could be obtained based on these drawings by those ordinary skilled in the art without creative efforts.

Reference signs: 100—image collection apparatus; 101—camera; 102—light source; 103—clamping plate; 500—Overhang detection apparatus for battery electrode sheet; 510—acquisition module; 520—location determination module; 530—measurement value determination module; 600—Overhang detection device for battery electrode sheet; 610—processor; 620—memory.

DETAILED DESCRIPTION OF EMBODIMENTS

The technical solutions in the embodiments of the present application will be described below in combination with the drawings. The following embodiments are merely used to illustrate the technical solutions of the present application more clearly, and thus may only be used as examples, and the protection scope of the present application cannot be limited thereto.

Unless otherwise defined, all technological and scientific terms used herein have the same meanings as those commonly understood by those skilled in the art to which the present application belongs. The terms used herein are merely for the purpose of describing specific embodiments, but are not intended to limit the present application. The terms "include" and "have" and any variations thereof in the specification and claims of the present application as well as the brief description of the drawings described above are intended to cover non-exclusive inclusions.

In the description of the embodiments of the present application, the technical terms "first", "second", and the like are only used to distinguish different objects and cannot be understood as indicating or implying relative importance or implying the quantity, specific order, or primary and secondary relationship of the indicated technical features. In the description of the embodiments of the present application, "a plurality of" means two or more, unless otherwise specifically specified.

The phrase "embodiment" referred to herein means that specific features, structures, or characteristics described in conjunction with the embodiment may be included in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described herein may be combined with another embodiment.

In the description of the embodiments of the present application, the term "and/or" is merely an association relationship describing associated objects, and indicates that there may be three relationships, for example, A and/or B, which may indicate that A exists alone, A and B exist at the same time, and B exists alone. In addition, the character "/" herein generally indicates that the associated objects are in an "or" relationship. In this disclosure, the phrases "at least one of A, B, and C" and "at least one of A, B, or C" both mean only A, only B, only C, or any combination of A, B, and C.

In the description of the embodiments of the present application, the term "a plurality of" means two or more (including two). Similarly, "a plurality of groups" refers to two or more groups (including two groups), and "a plurality of sheets" refers to two or more sheets (including two sheets).

At present, based on the development of the market situation, the application of batteries is increasingly widespread. The batteries are not only used in energy storage power systems of water power, firepower, wind power and solar power plants and the like, but also widely used in many fields of electric vehicles such as electric bicycles, electric motorcycles, and electric vehicles, military equipment, aerospace, and the like. With the continuous expansion of the application field of the batteries, their market demand is also constantly expanding.

With the widespread application of the batteries, the production process technology of the batteries is also continuously developed. At present, a battery process mainly includes two types of winding and laminating, which relate to compounding a cathode, an anode and a separator of a battery, so as to obtain a compounded electrode sheet. For the compounded electrode sheet, it is needed to measure an Overhang size.

In the existing Overhang measurement technology, a traditional fixed-area linear fitting solution is used to position each electrode sheet edge in a fixed area, and then determine an Overhang measurement value on the basis of a positioning result of each electrode sheet edge. For example, an image of a battery electrode sheet is collected, and an area where an anode edge is located and an area where a cathode edge is located are pre-fixed areas in the image; then, linear fitting is performed in the fixed area where the anode edge is located, so as to position the anode edge; linear fitting is performed in the fixed area where the cathode edge is located, so as to position the cathode edge; and finally, an Overhang measurement value is determined by using the positioning result of the anode edge and the positioning result of the cathode edge.

The applicant finds that, although Overhang measurement can be realized in this measurement mode, the flexibility and adaptability of the Overhang measurement are worse since the electrode sheet edge is positioned by using the fixed area. For example, this measurement mode is only suitable for offline measurement and cannot perform online measurement in the battery process. As another example, the image collection mode of this measurement mode is limited, the image can only be collected on the basis of the fixed area, and the image collection mode cannot be flexibly changed, accordingly, this measurement mode cannot be applied to a complex environment.

It is discovered after careful consideration of the applicant that, the essential reason for the worse flexibility and adaptability of the above-mentioned measurement mode is that the positioning is based on the fixed area. For example, since the positioning needs to be performed on the basis of the fixed area, if online measurement is used, the fixed area cannot be accurately positioned, so that only an offline measurement mode can be used. As another example, since the positioning needs to be performed on the basis of the fixed area, the collected image must include the fixed area, therefore the image can only be collected on the basis of the fixed area, and the image collection mode cannot be changed at will to be applied to a complex environment.

If the positioning of each electrode sheet does not depend on a fixed area any more, but depends on a flexible and variable area, the positioning is not limited by the fixed area, so that the flexibility and adaptability are greatly improved.

Based on the above thinking, the applicant designs a technical solution to reduce the limitation on the Overhang measurement and improve the flexibility and adaptability of the Overhang measurement.

In the technical solution, the traditional fixed-area linear fitting solution is no longer used, but the location of each electrode sheet edge is determined on the basis of a dynamically determined area. Since the area is no longer fixed, the positioning of each electrode sheet edge is more flexible. For example, there is no need to divide, in advance, the area where each electrode sheet edge is located, so that the technical solution is not only suitable for offline measurement, but also suitable for online measurement.

Therefore, in this way, the flexibility of positioning each electrode sheet edge can be improved, thereby improving the flexibility of the Overhang measurement; and on the basis of improving the flexibility, the adaptability of the Overhang measurement is correspondingly improved. For example, when the positioning of the fixed area is not considered, the image collection mode is more flexible, and thus can be applicable to the Overhang measurement of more complex environments.

The technical solution provided in the embodiment of the present application may be used in a battery manufacturing process, including a laminating process and a winding process, in which the Overhang of the compounded battery electrode sheet is measured, and the measurement value of the Overhang may be used for judging whether the compounded battery electrode sheet meets specifications.

The technical solution provided in the embodiment of the present application may be applied to an Overhang detection system for a battery electrode sheet, where the detection system may belong to a part of a laminating machine or a winding machine, and may also be a part independent of the laminating machine or the winding machine.

The Overhang detection system for the battery electrode sheet may include an Overhang detection device for the battery electrode sheet, and an image collection apparatus, wherein the Overhang detection device for the battery electrode sheet is in communication connection with the image collection apparatus.

The image collection apparatus is used for collecting an image of the battery electrode sheet, and the Overhang detection device is used for controlling the image collection apparatus, and implementing Overhang measurement on the basis of the image collected by the image collection apparatus. Of course, in some embodiments, the control of the image collection apparatus may also be implemented by other control devices, and is not limited to being implemented by the Overhang detection device. Moreover, the Overhang detection device may be understood as a smart device having data processing capability and data storage capability or the like, or a smart controller, a smart processor, etc.

Figure 1:
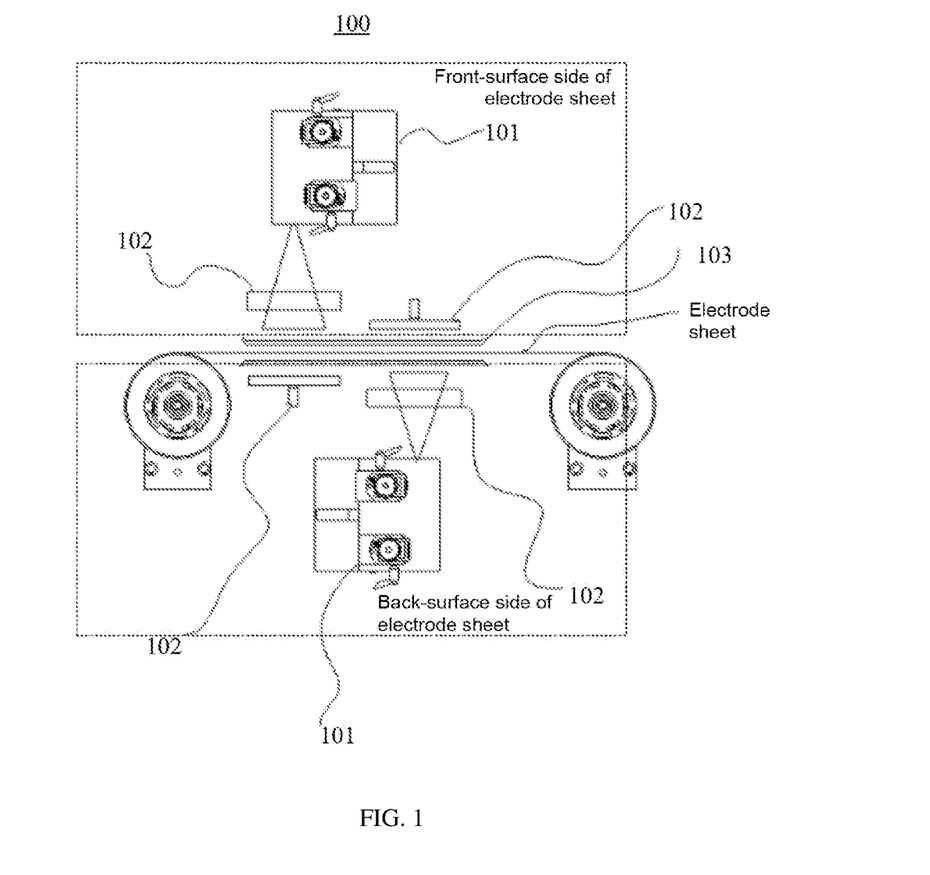
FIG. 1 is a schematic structural diagram of an image collection apparatus provided in an embodiment of the present application.

Please refer to FIG. 1, it is a schematic structural diagram of an image collection apparatus provided in an embodiment of the present application. The image collection apparatus includes: a camera 101, a light source 102, and a clamping plate 103.

The technical solution provided in the embodiment of the present application is used for performing Overhang detection on the compounded electrode sheet, and in the battery manufacturing process, the battery electrode sheet is transferred to the next processing node after being compounded, that is, the compounded battery electrode sheet moves in a preset moving direction.

The compounded battery electrode sheet includes a front surface and a back surface, and its electrode sheet structure sequentially includes a cathode, a separator, an anode, a separator and a cathode. In addition, in the preset moving direction, the cathodes are sheet-like structures separated from each other.

Therefore, a part of the clamping plate 103 is disposed on a front-surface side of the electrode sheet, the other part of the clamping plate 103 is disposed on a back-surface side of the electrode sheet, and when an image needs to be collected, a corresponding control apparatus controls the two parts of the clamping plate 103 to clamp the electrode sheet, so as to realize stable collection of the image.

Since the front and back surfaces of the electrode sheet are structurally symmetrical, Overhang measurement may be achieved by collecting the image from the front surface or collecting the image from the back surface. In some embodiments, the camera 101 may include a front-surface camera module and/or a back-surface camera module (including a front-surface camera module and a back-surface camera module in FIG. 1).

Correspondingly, when the camera 101 includes a front-surface camera module, the light source 102 includes a light source of the front-surface camera module; when the camera 101 includes a back-surface camera module, the light source 102 includes a light source of the back-surface camera module; and when the camera 101 includes a front-surface camera module and a back-surface camera module, the light source 102 includes a light source of the front-surface camera module and a light source of the back-surface camera module. In FIG. 1, the light source of the front-surface camera module includes a front-surface light source and a back-surface light source, and the light source of the back-surface camera module also includes a front-surface light source and a back-surface light source.

The light source 102 is used for lighting the electrode sheet, so as to facilitate the camera to collect an image, and the front-surface light source is used for front-surface lighting, and the back-surface light source is used for back-surface lighting. The light source 102 may be a flash lamp, a lighting lamp, and the like, which is not limited herein.

In addition, by using the technical solution provided in the embodiments of the present application, the front-surface camera module and/or the back-surface camera module may be provided with one or more cameras.

If one camera 101 is provided, the camera 101 is used for collecting a complete image of the battery electrode sheet corresponding to one cathode, and the camera 101 may be a large-field-of-view linear-array camera meeting frame rate requirements.

If a plurality of cameras 101 are provided, the plurality of cameras 101 are respectively used for collecting images of different fields of view of the battery electrode sheet corresponding to one cathode, for example, images of four-corner areas. At this time, the plurality of cameras 101 may be high-frame-rate small-field-of-view area-array cameras.

Figure 2:
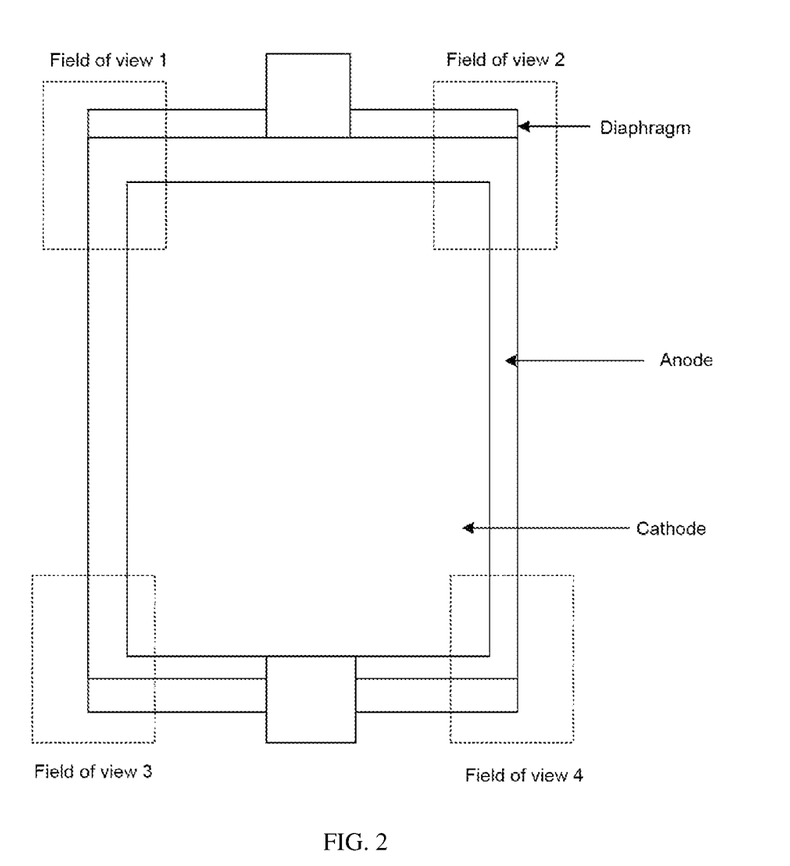
FIG. 2 is a first example diagram of an image provided in an embodiment of the present application.
Figure 3:
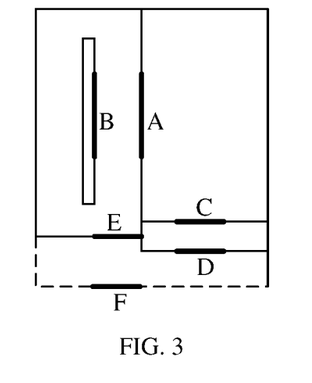
FIG. 3 is a second example diagram of an image provided in an embodiment of the present application.

For ease of understanding, please refer to FIG. 2 and FIG. 3, if one camera 101 is provided, the collected image may be shown in FIG. 2, a plurality of fields of view are included in FIG. 2, and the images of the plurality of fields of view may be collected by a plurality of cameras; and if a plurality of cameras 101 are provided, the collected images are images based on different fields of view of the overall image of FIG. 2, and as shown in FIG. 3, which are images of a field of view 3. It should be noted that, if only one camera 101 is provided, there should be only one field of view, and the field of view includes a complete image of the electrode sheet; and the field of view annotated in FIG. 2 is only for the ease of understanding the correspondence between FIG. 3 and the field of view 3.

Figure 4:
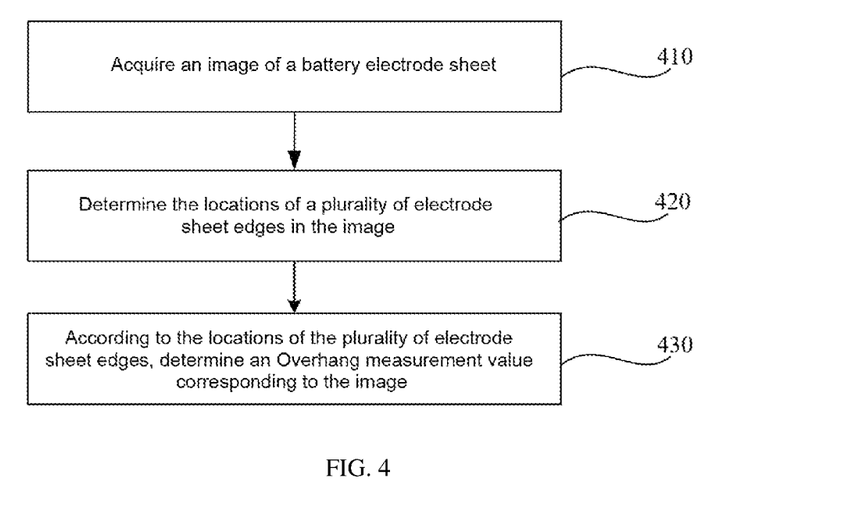
FIG. 4 is a flowchart of an Overhang detection method for a battery electrode sheet provided in an embodiment of the present application.

Based on the above introduction of inventive concepts and application scenarios, please next refer to FIG. 4, it is a flowchart of an Overhang detection method for a battery electrode sheet provided in an embodiment of the present application. The detection method includes:

Step 410: acquiring an image of a battery electrode sheet.

Step 420: determining the locations of a plurality of electrode sheet edges in the image, wherein the plurality of electrode sheet edges are electrode sheet edges related to an Overhang measurement value corresponding to the image, the location of each electrode sheet edge is determined on the basis of an area where each electrode sheet edge is located, and the area where each electrode sheet edge is located is a dynamically determined area.

Step 430: determining, according to the locations of the plurality of electrode sheet edges, the Overhang measurement value corresponding to the image.

In combination with the foregoing introduction of application scenarios, in step 410, the image of the battery electrode sheet may be an image of a complete battery electrode sheet, and may also be an image of different areas (different fields of view) of the battery electrode sheet.

Correspondingly, the image in step 410 may be an image or a plurality of images. Regardless of whether there is one image or a plurality of images, the corresponding image processing modes are the same.

In combination with the foregoing introduction of the image collection apparatus, in step 410, images sent by the front-surface camera module and/or the back-surface camera module are received.

In step 420, the locations of the plurality of electrode sheet edges in the image are determined, and the plurality of electrode sheets are electrode sheets related to the Overhang measurement value corresponding to the image.

It can be understood that, since a plurality of images may be acquired in step 410, the plurality of images correspond to different fields of view of the battery electrode sheet. In this case, the Overhang measurement value determined on the basis of the image cannot represent a final Overhang measurement value, and the final Overhang measurement value needs to be determined on the basis of Overhang measurement values which are respectively determined on the basis of the plurality of images. Therefore, in step 420, the plurality of electrode sheet edges are defined as the electrode sheet edges related to the Overhang measurement value corresponding to the image.

In the embodiments of the present application, the location of each electrode sheet edge is determined on the basis of the area where each electrode sheet edge is located, and the area where each electrode sheet edge is located is a dynamically determined area. Since the areas where some electrode sheet edges are located are dynamically determined, and may be determined in combination with the locations of other electrode sheet edges. In the embodiments of the present application, the determination of the area and the positioning based on the area are integrated into step 420. In fact, it should be understood that once the area where each electrode sheet edge is located is determined, the location of the electrode sheet edge is next determined on the basis of the area where the electrode sheet edge is located, that is, during the positioning process of the electrode sheet edge, the area where the electrode sheet edge is located is dynamically determined.

In step 430, the Overhang measurement value corresponding to the image is determined according to the locations of the plurality of electrode sheet edges. When different embodiments are used in step 410 and step 420, step 430 may also have various embodiments, which will be described in detail in the following embodiments.

In the embodiments of the present application, when the location of each electrode sheet edge related to the Overhang measurement value corresponding to the image is determined, the location of each electrode sheet edge is determined on the basis of the area where each electrode sheet edge is located; and moreover, the area where each electrode sheet edge is located is a dynamically determined area. Compared with the related art, the traditional fixed-area linear fitting solution is not utilized any more, but the location of each electrode sheet edge is determined on the basis of the dynamically determined area, and since the area is not fixed any more, the positioning of each electrode sheet edge is more flexible. For example, there is no need to divide, in advance, the area where each electrode sheet edge is located. Therefore, by means of this mode, the flexibility of positioning each electrode sheet edge can be improved, thereby improving the flexibility of Overhang measurement; and on the basis of improving the flexibility, the adaptability of the Overhang measurement is correspondingly improved. For example, when the positioning of the fixed area is not considered, this mode can be applicable to the Overhang measurement of more complex environments.

As an optional embodiment, in step 420, the area where each electrode sheet edge is located is an area determined on the basis of preset area parameter information, or an area determined on the basis of the location of one or more electrode sheet edges.

The preset area parameter information is parameter information used for positioning an area, for example, area boundary point pixel coordinates, an area length, an area width, etc.

In some embodiments, an area where a first electrode sheet edge of which the location is to be determined among a plurality of electrode sheet edges is located is determined on the basis of the preset area parameter information, and an area where an electrode sheet edge of which the location is to be determined behind the first electrode sheet edge is located is determined on the basis of the location of the first electrode sheet edge of which the location is to be determined, or is determined in combination with the locations of a plurality of electrode sheet edges of which the locations have been determined.

In the embodiments of the present application, the area where each electrode sheet edge is located may be determined on the basis of the preset area parameter information, and may also be determined on the basis of the location of one or more electrode sheet edges, so that the positioning mode of each electrode sheet edge is more flexible.

As an optional embodiment, the image includes: a first electrode sheet edge and a second electrode sheet edge; an area where the first electrode sheet edge is located is determined on the basis of the preset area parameter information, and an area where the second electrode sheet edge is located is determined on the basis of the location of the first electrode sheet edge and a first location relationship; and the first location relationship is a location relationship between the first electrode sheet edge and the second electrode sheet edge.

The first electrode sheet edge may be understood as a first electrode sheet edge of which the location is to be determined, and the second electrode sheet edge may be understood as a second electrode sheet edge of which the location is to be determined.

Correspondingly, for the first electrode sheet edge, the location determination process thereof includes: determining the area where the first electrode sheet edge is located on the basis of the preset area parameter information; and determining the location of the first electrode sheet edge on the basis of the area where the first electrode sheet edge is located.

For the second electrode sheet edge, the location determination process thereof includes: determining the area where the second electrode sheet edge is located on the basis of the location of the first electrode sheet edge and the first location relationship; and determining the location of the second electrode sheet edge on the basis of the area where the second electrode sheet edge is located.

The first location relationship is the location relationship between the first electrode sheet edge and the second electrode sheet edge, for example, the first electrode sheet edge is on the left side, the upper side and the like of the second electrode sheet edge. Based on the location relationship, after the location of the first electrode sheet edge is determined, the area where the second electrode sheet edge is located may also be determined. For example, if the first electrode sheet edge is above the second electrode sheet edge, the area where the second electrode sheet edge is located is a lower area of the location where the first electrode sheet edge is located.

In the embodiments of the present application, for the first electrode sheet edge and the second electrode sheet edge, the area where the first electrode sheet edge is located may be determined on the basis of the preset area parameter information, and the area where the second electrode sheet edge is located is determined on the basis of the location of the first electrode sheet edge and the first location relationship, that is, the area where the electrode sheet edge is located may be flexibly determined in combination with the location of one electrode sheet edge, so that the flexibility of positioning the electrode sheet edge is improved.

As an optional embodiment, the image may further include: a third electrode sheet edge; an area where the third electrode sheet edge is located is determined on the basis of the location of the first electrode sheet edge, the location of the second electrode sheet edge and a second location relationship; and the second location relationship is a location relationship among the first electrode sheet edge, the second electrode sheet edge, and the third electrode sheet edge.

The third electrode sheet edge may be understood as an electrode sheet edge of which the location is to be determined behind the second electrode sheet edge, and the area where the electrode sheet edge is located needs to be determined in combination with the locations of the first electrode sheet edge and the second electrode sheet edge.

Correspondingly, the process of determining the location of the third electrode sheet edge includes: determining the area where the third electrode sheet edge is located on the basis of the location of the first electrode sheet edge, the location of the second electrode sheet edge and the second location relationship; and determining the location of the third electrode sheet edge on the basis of the area where the third electrode sheet edge is located.

The second location relationship is the location relationship among the first electrode sheet edge, the second electrode sheet edge and the third electrode sheet edge. For example, the third electrode sheet edge is below the first electrode sheet edge and on the left side of the second electrode sheet edge. Based on the location relationship, after the location of the first electrode sheet edge and the location of the second electrode sheet edge are determined, the area where the third electrode sheet edge is located may also be determined. For example, the third electrode sheet edge is below the first electrode sheet edge and on the left side of the second electrode sheet edge, then the area where the third electrode sheet edge is located is below the location where the first electrode sheet edge is located and on the left side of the location where the second electrode sheet edge is located.

In the embodiments of the present application, the area where the third electrode sheet edge is located is determined in combination with the location of the first electrode sheet edge, the location of the second electrode sheet edge and the second location relationship, that is, the area where the electrode sheet edge is located may be flexibly determined in combination with the locations of at least two electrode sheet edges, so that the flexibility of positioning the electrode sheet edge is improved.

As an optional embodiment, the image may further include: a fourth electrode sheet edge; an area where the fourth electrode sheet edge is located is determined on the basis of the location of the first electrode sheet edge, the location of the second electrode sheet edge, the location of the third electrode sheet edge and a third location relationship; and the third location relationship is a location relationship among the first electrode sheet edge, the second electrode sheet edge, the third electrode sheet edge and the fourth electrode sheet edge.

The fourth electrode sheet edge may be understood as an electrode sheet edge of which the location is to be determined behind the third electrode sheet edge, and the area where the electrode sheet edge is located is determined in combination with the location of the first electrode sheet edge, the location of the second electrode sheet edge, the location of the third electrode sheet edge, and the third location relationship.

Correspondingly, the process of determining the location of the fourth electrode sheet edge includes: determining the area where the fourth electrode sheet edge is located on the basis of the location of the first electrode sheet edge, the location of the second electrode sheet edge, the location of the third electrode sheet edge and the third location relationship; and determining the location of the fourth electrode sheet edge on the basis of the area where the fourth electrode sheet edge is located.

The third location relationship is the location relationship among the first electrode sheet edge, the second electrode sheet edge, the third electrode sheet edge and the fourth electrode sheet edge. For example, the fourth electrode sheet edge is below the first electrode sheet edge, on the left side of the second electrode sheet edge and above the third electrode sheet edge. Based on the location relationship, after the location of the first electrode sheet edge, the location of the second electrode sheet edge and the location of the third electrode sheet edge are determined, the area where the third electrode sheet edge is located may also be determined. For example, the area where the fourth electrode sheet edge is located is below the location where the first electrode sheet edge is located, on the left side of the location where the second electrode sheet edge is located, and above the location where the third electrode sheet edge is located.

In the embodiments of the present application, the area where the fourth electrode sheet edge is located is determined in combination with the location of the first electrode sheet edge, the location of the second electrode sheet edge, the location of the third electrode sheet edge and the third location relationship, so that the area where the electrode sheet edge is located may be flexibly determined in combination with the locations of at least three electrode sheet edges, and thus the flexibility of positioning the electrode sheet edge is improved.

It can be understood that, when more electrode sheet edges are involved, the area where the electrode sheet edge is located may be determined in combination with the locations of more electrode sheet edges, which is not limited herein.

As an optional embodiment, the first electrode sheet edge is a vertical cathode edge, the second electrode sheet edge includes a vertical anode edge and a horizontal cathode edge, the third electrode sheet edge includes a horizontal cathode ceramic edge and a horizontal separator edge, and the fourth electrode sheet edge is a horizontal anode edge.

This embodiment may be used as an embodiment of each electrode sheet edge corresponding to the image shown in FIG. 3, that is, when the image in step 410 is the image shown in FIG. 3, each electrode sheet edge is each electrode sheet edge described in this embodiment.

In this embodiment, in step 420, an area where the vertical cathode edge is located is first determined in combination with the preset area parameter information, and then the location of the vertical cathode edge is determined on the basis of the area where the vertical cathode edge is located. Next, an area where the vertical anode edge is located is determined on the basis of the location of the vertical cathode edge and a location relationship between the vertical cathode edge and the vertical anode edge, and the location of the vertical anode edge is determined on the basis of the area where the vertical anode edge is located; and an area where the horizontal cathode edge is located is determined on the basis of the location of the vertical cathode edge and a location relationship between the vertical cathode edge and the horizontal cathode edge, and the location of the horizontal cathode edge is determined on the basis of the area where the horizontal cathode edge is located.

Then, on the basis of the location of the vertical cathode edge, the location of the vertical anode edge and/or the horizontal cathode edge, and the location relationship among the vertical cathode edge, the vertical anode edge and/or the horizontal cathode edge and the horizontal cathode ceramic edge, an area where the horizontal cathode ceramic edge is located is determined, and the location of the horizontal cathode ceramic edge is determined on the basis of the area where the horizontal cathode ceramic edge is located. The location determination process of the horizontal separator edge refers to the location determination process of the horizontal cathode ceramic edge, and thus details are not described herein again.

Then, on the basis of the location of the vertical cathode edge, the location of at least one of the vertical anode edge and the horizontal cathode edge, the location of at least one of the horizontal cathode ceramic edge and the horizontal separator edge, and the location relationship among at least one of the vertical cathode edge, the vertical anode edge and the horizontal cathode edge, at least one of the horizontal cathode ceramic edge and the horizontal diagram edge, and the horizontal anode edge, an area where the horizontal anode edge is located is determined, and the location of the horizontal anode edge is determined according to the area where the horizontal anode edge is located.

In the embodiments of the present application, the electrode sheet edges related to the Overhang measurement value include: the vertical cathode edge, the vertical anode edge, the horizontal cathode edge, the horizontal cathode ceramic edge, the horizontal separator edge and the horizontal anode edge, and flexible positioning of these electrode sheet edges is realized in a positioning mode based on dynamic areas, thereby flexibly determining the Overhang measurement value.

Further, based on the electrode sheet edges described above, as an optional embodiment, step 430 includes: determining a distance between a cathode ceramic electrode sheet and a separator according to the location of the horizontal cathode ceramic edge and the location of the horizontal separator edge; determining a distance between an anode and the separator according to the location of the horizontal anode edge and the location of the horizontal separator edge; determining a first distance between a cathode and the anode according to the location of the horizontal cathode edge and the location of the horizontal anode edge; determining a second distance between the cathode and the anode according to the location of the vertical cathode edge and the location of the vertical anode edge; determining a distance between the anode and the cathode ceramic electrode sheet according to the location of the horizontal anode edge and the location of the horizontal cathode ceramic edge; determining a cathode sheet width according to the location of the vertical cathode edge; determining an anode sheet width according to the location of the vertical anode edge; and according to the distance between the cathode ceramic electrode sheet and the separator, the distance between the anode and the separator, the first distance, the second distance, the distance between the anode and the cathode ceramic electrode sheet, the cathode sheet width and the anode sheet width, determining the Overhang measurement value corresponding to the image.

This embodiment may be used as an embodiment for determining the Overhang measurement value corresponding to the image shown in FIG. 3, that is, when the image in step 410 is the image shown in FIG. 3, a determination mode of the corresponding Overhang measurement value.

In the embodiments of the present application, the Overhang measurement value may not refer to a specific value, but instead refers to the value of an associated measurement item, that is, referring to any one or more of the distance between the cathode ceramic electrode sheet and the separator, the distance between the anode and the separator, the first distance, the second distance, the distance between the anode and the cathode ceramic electrode sheet, the cathode sheet width and the anode sheet width.

Based on these measurement values, the measurement values may be integrated to determine a final Overhang measurement value; and of course, these measurement values may also be directly used as the final Overhang measurement values. Correspondingly, when evaluation is performed on the basis of the Overhang measurement value, the integrated Overhang measurement value may be compared with a standard integrated Overhang measurement value, so as to evaluate whether the compounded battery electrode sheet meets the specifications. Each measurement value may also be compared with a corresponding standard measurement value respectively, and whether the compounded battery electrode sheet meets the specifications is evaluated in combination with a plurality of comparison results.

The distance between the cathode ceramic electrode sheet edge and the separator may be the distance between the cathode ceramic electrode sheet edge and the separator in the vertical direction. The distance between the anode and the separator may be the distance between the anode and the separator in the vertical direction. The first distance between the cathode and the anode may be the distance between the horizontal cathode edge and the horizontal anode edge in the vertical direction. The second distance between the cathode and the anode may be the distance between the vertical cathode edge and the vertical anode edge in the horizontal direction. The distance between the anode and the cathode ceramic electrode sheet may be the distance between the horizontal anode edge and the cathode ceramic electrode sheet edge in the vertical direction.

In some embodiments, the cathode sheet width is a distance between the location of the vertical cathode edge in the symmetrical image in FIG. 3 (the image with a symmetrical field of view) and the location of the vertical cathode edge in FIG. 3. The anode sheet width is a distance between the location of the vertical anode edge in the symmetrical image in FIG. 3 and the location of the vertical anode edge in FIG. 3.

Of course, if the image includes vertical cathode edges on two sides or vertical anode edges on two sides, the cathode sheet width may be directly determined according to the locations of the vertical cathode edges on the two sides, and the anode sheet width is determined according to the vertical anode edges on the two sides.

In the embodiments of the present application, by means of determining the distance between the cathode ceramic electrode sheet and the separator, the distance between the anode and the separator, the first distance, the second distance, the distance between the anode and the cathode ceramic electrode sheet, the cathode sheet width and the anode sheet width, the Overhang measurement value corresponding to the image is accurately determined.

As mentioned in the foregoing embodiments, the image in step 410 may include a plurality of images, and the plurality of images respectively correspond to different areas of the battery electrode sheet. In this embodiment, after step 430, the detection method further includes: according to Overhang measurement values respectively corresponding to the plurality of images, and a location relationship between the different areas, determining an Overhang measurement value corresponding to the battery electrode sheet.

According to the location relationship between the different areas, the integration mode of the Overhang measurement values corresponding to different images may be determined.

In some embodiments, if different areas are symmetrical areas, the integration mode of the measurement values corresponding to different images is, for example, adding or dividing a preset value after adding, etc.

In some other embodiments, if different areas are asymmetric areas, the integration mode of the measurement values corresponding to different images is, for example, weighted averaging, weighted summation, etc.

It can be understood that the specific integration mode may be flexibly set in combination with a specific application scenario, which is not limited herein. Moreover, which integration mode is used may be determined by pre-data simulation, data testing, etc.

In the embodiments of the present application, images of different areas of the battery electrode sheet are collected, and then the corresponding Overhang measurement values are determined respectively. Compared with an overall image determination mode, on one hand, the image processing mode is more flexible; and on the other hand, the fine-grained image processing precision is higher, and the final measurement result is more accurate.

As an optional embodiment, the plurality of images respectively correspond to four-corner areas of the battery electrode sheet.

In this embodiment, the four-corner areas of the battery electrode sheet are collected, that is, the images of the battery electrode sheets in four angular fields of view are collected, and the collected image of one of the fields of view may refer to the foregoing FIG. 3.

In the embodiments of the present application, the four-corner areas of the battery electrode sheet have symmetry, therefore not only can the universality or consistency of the processing modes of the images be guaranteed, but the Overhang measurement value corresponding to the battery electrode sheet can also be conveniently determined on the basis of the Overhang measurement values of the plurality of images.

In some other embodiments, the plurality of images may also respectively correspond to any two diagonal areas of the battery electrode sheet, or an area where a designated location is located, and the like, which is not limited in the embodiments of the present application.

As an optional embodiment, on the basis of the determination of the area where the electrode sheet is located, the location determination process of the electrode sheet edge may include: according to the location of the area where the electrode sheet edge is located, determining the location of an edge transition point in the area where the electrode sheet edge is located; and determining the location of the electrode sheet edge on the basis of the location of the edge transition point and a linear fitting algorithm.

In this embodiment, the positioning of the electrode sheet edge is realized in a linear fitting mode. It can be understood that, the electrode sheet edge is a straight line in the image, after the area where the straight line is located is determined, the edge transition point may be positioned in the area where the straight line is located in a binary white finding black mode, and the location of the positioned edge transition point is an approximate location where the straight line is located. However, since the edge transition point may not be on a straight line, it is also needed to perform linear fitting on these edge transition points by using the linear fitting algorithm, so as to accurately position the location of the electrode sheet edge.

In some embodiments, the linear fitting algorithm may be a least square method. Of course, other linear fitting algorithms may also be used, which is not limited herein.

In some embodiments, for the first electrode sheet edge mentioned above, before the edge transition point is determined, coarse area positioning may be performed first on the basis of the area where the first electrode sheet edge is located, so as to find an area of interest, and then the edge transition point is determined on the basis of the area of interest.

In the embodiments of the present application, on the basis of the dynamically determined area of each electrode sheet edge, the location of the edge transition point in the area where the electrode sheet edge is located is firstly determined, and then the location of the electrode sheet edge is effectively and accurately positioned on the basis of the location of the edge transition point and the linear fitting algorithm.

It can be understood that, on the basis of the area where the electrode sheet edge is located, other feasible linear positioning modes can also be used to position the electrode sheet edge. For example, reference is made to a fixed-area location fitting mode of the electrode sheet edge, which is not limited herein.

Figure 5:
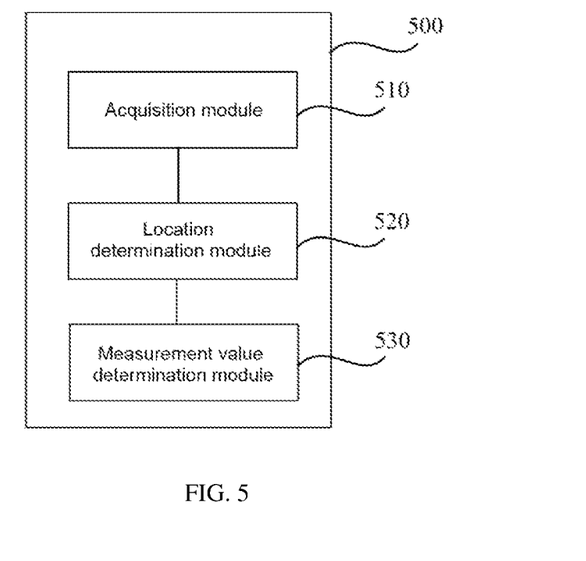
FIG. 5 is a schematic structural diagram of an Overhang detection apparatus for a battery electrode sheet provided in an embodiment of the present application.

Please refer to FIG. 5, an embodiment of the present application further provides an Overhang detection apparatus 500 for a battery electrode sheet, the Overhang detection apparatus 500 for the battery electrode sheet corresponds to the foregoing Overhang detection method for the battery electrode sheet, and includes: an acquisition module 510, a location determination module 520, and a measurement value determination module 530.

The acquisition module 510 is configured to acquire an image of a battery electrode sheet; the location determination module 520 is configured to determine locations of a plurality of electrode sheet edges in the image, wherein the plurality of electrode sheet edges are electrode sheet edges related to an Overhang measurement value corresponding to the image, the location of each electrode sheet edge is determined on the basis of an area where each electrode sheet edge is located, and the area where each electrode sheet edge is located is a dynamically determined area; and the measurement value determination module 530 is configured to determine, according to the locations of the plurality of electrode sheet edges, the Overhang measurement value corresponding to the image.

In the embodiments of the present application, the measurement value determination module 530 is specifically configured to: determine a distance between a cathode ceramic electrode sheet and a separator according to the location of a horizontal cathode ceramic edge and the location of a horizontal separator edge; determine a distance between an anode and the separator according to the location of a horizontal anode edge and the location of the horizontal separator edge; determine a first distance between a cathode and the anode according to the location of the horizontal cathode edge and the location of a horizontal anode edge; determine a second distance between the cathode and the anode according to the location of a vertical cathode edge and the location of a vertical anode edge; determine a distance between the anode and the cathode ceramic electrode sheet according to the location of the horizontal anode edge and the location of the horizontal cathode ceramic edge; determine a cathode sheet width according to the location of the vertical cathode edge; determine an anode sheet width according to the location of the vertical anode edge; and according to the distance between the cathode ceramic electrode sheet and the separator, the distance between the anode and the separator, the first distance, the second distance, the distance between the anode and the cathode ceramic electrode sheet, the cathode sheet width and the anode sheet width, determine the Overhang measurement value corresponding to the image.

In the embodiments of the present application, the measurement value determination module 530 is further configured to: according to Overhang measurement values respectively corresponding to a plurality of images, and a location relationship between different areas, determine an Overhang measurement value corresponding to the battery electrode sheet.

In the embodiments of the present application, for any electrode sheet edge, the location determination module 520 is specifically configured to: according to the location of the area where the electrode sheet edge is located, determine the location of an edge transition point in the area where the electrode sheet edge is located; and determine the location of the electrode sheet edge on the basis of the location of the edge transition point and a linear fitting algorithm.

Since the Overhang detection apparatus 500 for the battery electrode sheet corresponds to the Overhang detection method for the battery electrode sheet, the embodiments and the technical effects of the function modules also refer to the embodiments and the technical effects of the detection method, and thus no repeated introduction will not be given herein.

Figure 6:
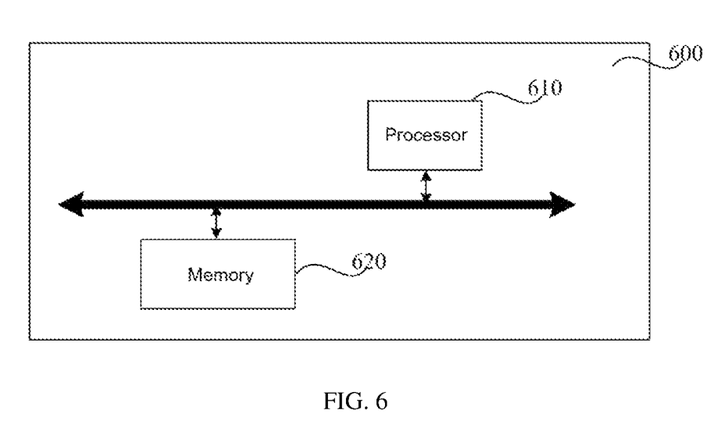
FIG. 6 is a schematic structural diagram of an Overhang detection device for a battery electrode sheet provided in an embodiment of the present application.

Based on the same inventive concept, referring to FIG. 6, an embodiment of the present application further provides an Overhang detection device 600 for a battery electrode sheet, which may be used as an executive body of the foregoing detection method, and includes: a processor 610; and a memory 620 in communication connection with the processor 610, wherein the memory 620 stores instructions executable by the processor 610, and the instructions are executed by the processor 610, so that the processor 610 may execute the Overhang detection method for the battery electrode sheet described in the foregoing embodiments.

The processor 610 and the memory 620 may form a communication connection by means of a communication bus.

In addition to the components shown in FIG. 6, the detection device may include more components, and FIG. 6 does not constitute a limitation on the structure thereof.

An embodiment of the present application further provides a computer-readable storage medium, wherein a computer program is stored on the computer-readable storage medium, and when run by a computer, the computer program executes the Overhang detection method for the battery electrode in the foregoing embodiment.

In the embodiments provided in the present application, it should be understood that, the disclosed apparatus and method may be implemented in other modes. The apparatus embodiments described above are merely exemplary, for example, the division of the units is only a logic function division, there may be other division modes in practical implementation, and as another example, a plurality of units or components may be combined or integrated to another system, or some features may be omitted or not implemented. From another point of view, the displayed or discussed mutual coupling or direct coupling or communication connection may be indirect coupling or communication connection of apparatuses or units by means of some communication interfaces, and may be in electrical, mechanical or other forms.

In addition, the units described as separate components may be separated physically or not, components displayed as units may be physical units or not, namely, may be located in one place, and may also be distributed on a plurality of units. A part or all of the units may be selected to implement the purposes of the solutions in the present embodiment according to actual demands.

Further, the functional modules in the embodiments of the present application may be integrated together to form an independent part, or each of the modules may exist alone, or two or more modules may be integrated to form an independent part.

The foregoing descriptions are merely embodiments of the present application, rather than limiting the protection scope of the present application. For those skilled in the art, the present application may have various changes and modifications. Any modifications, equivalent replacements, improvements and the like, made within the spirit and principles of the present application, shall all fall within the protection scope of the present application.

What is claimed is:

1. An Overhang detection method for a battery electrode sheet, comprising:
   acquiring an image of a battery electrode sheet;
   determining locations of a plurality of electrode sheet edges in the image, wherein the plurality of electrode sheet edges are electrode sheet edges related to an Overhang measurement value corresponding to the image, a location of each electrode sheet edge is determined based on an area where each electrode sheet edge is located, and the area where each electrode sheet edge is located is a dynamically determined area; and
   determining, according to the locations of the plurality of electrode sheet edges, the Overhang measurement value corresponding to the image.

2. The Overhang detection method for the battery electrode sheet according to claim 1, wherein the area where each electrode sheet edge is located is an area determined based on preset area parameter information, or an area determined based on a location of one or more electrode sheet edges.

3. The Overhang detection method for the battery electrode sheet according to claim 2, wherein:
   the image comprises a first electrode sheet edge and a second electrode sheet edge;
   an area where the first electrode sheet edge is located is determined based on the preset area parameter information, and an area where the second electrode sheet edge is located is determined based on a location of the first electrode sheet edge and a first location relationship; and
   the first location relationship is a location relationship between the first electrode sheet edge and the second electrode sheet edge.

4. The Overhang detection method for the battery electrode sheet according to claim 3, wherein:
   the image further comprises a third electrode sheet edge;
   an area where the third electrode sheet edge is located is determined based on the location of the first electrode sheet edge, a location of the second electrode sheet edge and a second location relationship; and
   the second location relationship is a location relationship among the first electrode sheet edge, the second electrode sheet edge and the third electrode sheet edge.

5. The Overhang detection method for the battery electrode sheet according to claim 4, wherein:
   the image further comprises a fourth electrode sheet edge;
   an area where the fourth electrode sheet edge is located is determined based on the location of the first electrode sheet edge, the location of the second electrode sheet edge, a location of the third electrode sheet edge and a third location relationship; and
   the third location relationship is a location relationship among the first electrode sheet edge, the second electrode sheet edge, the third electrode sheet edge and the fourth electrode sheet edge.

6. The Overhang detection method for the battery electrode sheet according to claim 5, wherein the first electrode sheet edge is a vertical cathode edge, the second electrode sheet edge comprises a vertical anode edge and a horizontal cathode edge, the third electrode sheet edge comprises a horizontal cathode ceramic edge and a horizontal separator edge, and the fourth electrode sheet edge is a horizontal anode edge.

7. The Overhang detection method for the battery electrode sheet according to claim 6, wherein determining, according to the locations of the plurality of electrode sheet edges, the Overhang measurement value corresponding to the image, comprises:
   determining a distance between a cathode ceramic electrode sheet and a separator according to a location of the horizontal cathode ceramic edge and a location of the horizontal separator edge;
   determining a distance between an anode and the separator according to a location of the horizontal anode edge and the location of the horizontal separator edge;
   determining a first distance between a cathode and the anode according to a location of the horizontal cathode edge and the location of the horizontal anode edge;
   determining a second distance between the cathode and the anode according to a location of the vertical cathode edge and a location of the vertical anode edge;
   determining a distance between the anode and the cathode ceramic electrode sheet according to the location of the horizontal anode edge and the location of the horizontal cathode ceramic edge;
   determining a cathode sheet width according to the location of the vertical cathode edge;
   determining an anode sheet width according to the location of the vertical anode edge; and
   according to the distance between the cathode ceramic electrode sheet and the separator, the distance between the anode and the separator, the first distance, the second distance, the distance between the anode and the cathode ceramic electrode sheet, the cathode sheet width and the anode sheet width, determining the Overhang measurement value corresponding to the image.

8. The Overhang detection method for the battery electrode sheet according to claim 1,
   wherein the image comprises a plurality of images of the battery electrode sheet, and the plurality of images respectively correspond to different areas of the battery electrode sheet;
   the detection method further comprising:
      according to Overhang measurement values respectively corresponding to the plurality of images, and a location relationship between the different areas, determining an Overhang measurement value corresponding to the battery electrode sheet.

9. The Overhang detection method for the battery electrode sheet according to claim 8, wherein the plurality of images respectively correspond to four-corner areas of the battery electrode sheet.

10. The Overhang detection method for the battery electrode sheet according to claim 1, wherein for any electrode sheet edge, a process of determining a location of the electrode sheet edge comprises:

according to a location of an area where the electrode sheet edge is located, determining a location of an edge transition point in the area where the electrode sheet edge is located; and determining the location of the electrode sheet edge based on the location of the edge transition point and a linear fitting algorithm.

11. An Overhang detection device for a battery electrode sheet, comprising:
   a processor; and
   a memory in communication connection with the processor and storing instructions that, when executed by the processor, cause the processor to implement the Overhang detection method for the battery electrode sheet according to claim 1.

12. The Overhang detection device for a battery electrode sheet according to claim 11, wherein the area where each electrode sheet edge is located is an area determined based on preset area parameter information, or an area determined based on a location of one or more electrode sheet edges.

13. The Overhang detection device for the battery electrode sheet according to claim 12, wherein:
   the image comprises a first electrode sheet edge and a second electrode sheet edge;
   an area where the first electrode sheet edge is located is determined based on the preset area parameter information, and an area where the second electrode sheet edge is located is determined based on a location of the first electrode sheet edge and a first location relationship; and
   the first location relationship is a location relationship between the first electrode sheet edge and the second electrode sheet edge.

14. The Overhang detection device for the battery electrode sheet according to claim 13, wherein:
   the image further comprises a third electrode sheet edge;
   an area where the third electrode sheet edge is located is determined based on the location of the first electrode sheet edge, a location of the second electrode sheet edge and a second location relationship; and
   the second location relationship is a location relationship among the first electrode sheet edge, the second electrode sheet edge and the third electrode sheet edge.

15. The Overhang detection device for the battery electrode sheet according to claim 14, wherein:
   the image further comprises a fourth electrode sheet edge;
   an area where the fourth electrode sheet edge is located is determined based on the location of the first electrode sheet edge, the location of the second electrode sheet edge, a location of the third electrode sheet edge and a third location relationship; and
   the third location relationship is a location relationship among the first electrode sheet edge, the second electrode sheet edge, the third electrode sheet edge and the fourth electrode sheet edge.

16. The Overhang detection device for the battery electrode sheet according to claim 15, wherein the first electrode sheet edge is a vertical cathode edge, the second electrode sheet edge comprises a vertical anode edge and a horizontal cathode edge, the third electrode sheet edge comprises a horizontal cathode ceramic edge and a horizontal separator edge, and the fourth electrode sheet edge is a horizontal anode edge.

17. The Overhang detection device for the battery electrode sheet according to claim 16, wherein determining, according to the locations of the plurality of electrode sheet edges, the Overhang measurement value corresponding to the image, comprises:
   determining a distance between a cathode ceramic electrode sheet and a separator according to a location of the horizontal cathode ceramic edge and a location of the horizontal separator edge;
   determining a distance between an anode and the separator according to a location of the horizontal anode edge and the location of the horizontal separator edge;
   determining a first distance between a cathode and the anode according to a location of the horizontal cathode edge and the location of the horizontal anode edge;
   determining a second distance between the cathode and the anode according to a location of the vertical cathode edge and a location of the vertical anode edge;
   determining a distance between the anode and the cathode ceramic electrode sheet according to the location of the horizontal anode edge and the location of the horizontal cathode ceramic edge;
   determining a cathode sheet width according to the location of the vertical cathode edge;
   determining an anode sheet width according to the location of the vertical anode edge; and
   according to the distance between the cathode ceramic electrode sheet and the separator, the distance between the anode and the separator, the first distance, the second distance, the distance between the anode and the cathode ceramic electrode sheet, the cathode sheet width and the anode sheet width, determining the Overhang measurement value corresponding to the image.

18. The Overhang detection device for the battery electrode sheet according to claim 11, wherein:
   the image comprises a plurality of images of the battery electrode sheet, and the plurality of images respectively correspond to different areas of the battery electrode sheet; and
   the detection method further comprises:
      according to Overhang measurement values respectively corresponding to the plurality of images, and a location relationship between the different areas, determining an Overhang measurement value corresponding to the battery electrode sheet.

19. An Overhang detection apparatus for a battery electrode sheet, comprising:
   an acquisition module, configured to acquire an image of a battery electrode sheet;
   a location determination module, configured to determine locations of a plurality of electrode sheet edges in the image, wherein the plurality of electrode sheet edges are electrode sheet edges related to an Overhang measurement value corresponding to the image, a location of each electrode sheet edge is determined based on an area where each electrode sheet edge is located, and the area where each electrode sheet edge is located is a dynamically determined area; and
   a measurement value determination module, configured to determine, according to the locations of the plurality of electrode sheet edges, the Overhang measurement value corresponding to the image.

* * * * *